US009581266B2

(12) United States Patent
Eriksen

(10) Patent No.: US 9,581,266 B2
(45) Date of Patent: Feb. 28, 2017

(54) DEVICE FOR A SPRING RETURN VALVE ACTUATOR AND METHOD OF OPERATING A VALVE

(71) Applicant: Electrical Subsea & Drilling AS, Straume (NO)

(72) Inventor: Egil Eriksen, Vassenden (NO)

(73) Assignee: Electrical Subsea & Drilling AS, Straume (NO)

( * ) Notice: Subject to any disclaimer, the term of this patent is extended or adjusted under 35 U.S.C. 154(b) by 309 days.

(21) Appl. No.: 14/346,278

(22) PCT Filed: Oct. 10, 2012

(86) PCT No.: PCT/NO2012/050198
§ 371 (c)(1),
(2) Date: Mar. 20, 2014

(87) PCT Pub. No.: WO2013/055230
PCT Pub. Date: Apr. 18, 2013

(65) Prior Publication Data
US 2014/0231685 A1    Aug. 21, 2014

(30) Foreign Application Priority Data

Oct. 12, 2011    (NO) .................................. 20111384

(51) Int. Cl.
*F16K 31/50*    (2006.01)
*F16K 31/04*    (2006.01)
*F16K 31/56*    (2006.01)

(52) U.S. Cl.
CPC ............ *F16K 31/047* (2013.01); *F16K 31/50* (2013.01); *F16K 31/56* (2013.01)

(58) Field of Classification Search
CPC ......... F16K 31/047; F16K 31/50; F16K 31/56
(Continued)

(56) References Cited

U.S. PATENT DOCUMENTS 2,860,266 A * 11/1958 Schrader ............. F16H 25/2018
251/129.11
2,947,394 A * 8/1960 Grover .................... F16D 67/06
192/18 B (Continued)

FOREIGN PATENT DOCUMENTS

GB             2318630        4/1998
GB        EP 1333207 A2 *    8/2003   ........... F16K 31/047
(Continued)

OTHER PUBLICATIONS

International Search Report and Written Opinion for Application No. PCT/NO2012/050198 dated Jan. 7, 2013.

*Primary Examiner* — Craig Schneider
*Assistant Examiner* — Josephine Trinidad-Borges
(74) *Attorney, Agent, or Firm* — Patterson & Sheridan LLP

(57) ABSTRACT

A device for a valve actuator is described, the valve actuator being provided with a spindle nut surrounding a portion of an actuator spindle and engaging an external threaded portion arranged on the actuator spindle, the spindle nut being axially fixed relative to the actuator spindle, and the actuator spindle being in rotation-preventing engagement with an end cap or an actuator housing, and the spindle nut being connected via transmission means to a first driving motor.

3 Claims, 6 Drawing Sheets

(58) Field of Classification Search
USPC ...... 251/291, 129.11, 129.13, 264, 266, 267, 251/273, 277, 278
See application file for complete search history.

(56) References Cited

U.S. PATENT DOCUMENTS

| | | | | |
|---|---|---|---|---|
| 3,087,105 | A * | 4/1963 | Hoover | 192/141 |
| 3,206,628 | A * | 9/1965 | Wilke | F16H 25/20 310/75 R |
| 3,908,959 | A * | 9/1975 | Fichtner | F16J 15/50 251/129.03 |
| 4,920,811 | A * | 5/1990 | Hopper | E21B 33/0355 251/129.11 |
| 4,943,187 | A * | 7/1990 | Hopper | B63C 11/52 166/338 |
| 5,195,721 | A * | 3/1993 | Akkerman | F16D 27/105 192/56.1 |
| 5,224,512 | A * | 7/1993 | Nogami | F16K 37/00 137/552 |
| 5,518,462 | A * | 5/1996 | Yach | F16K 31/043 251/129.11 |
| 6,257,549 | B1 * | 7/2001 | Hopper | H02J 9/06 166/363 |
| 7,005,847 | B2 * | 2/2006 | Gassman | G01D 5/145 324/207.15 |
| 2004/0056229 | A1 * | 3/2004 | Biester | F16K 31/05 251/205 |
| 2008/0061769 | A1 * | 3/2008 | Junk | F16K 37/0033 324/207.22 |
| 2008/0083892 | A1 * | 4/2008 | Fenton | F16K 3/0254 251/68 |
| 2009/0211762 | A1 | 8/2009 | Voss | |
| 2010/0127646 | A1 | 5/2010 | Biester et al. | |

FOREIGN PATENT DOCUMENTS

| | | |
|---|---|---|
| NO | 323101 | 1/2007 |
| NO | 20090907 A | 8/2009 |
| WO | 03021077 | 3/2003 |
| WO | 2006071124 | 7/2006 |

* cited by examiner

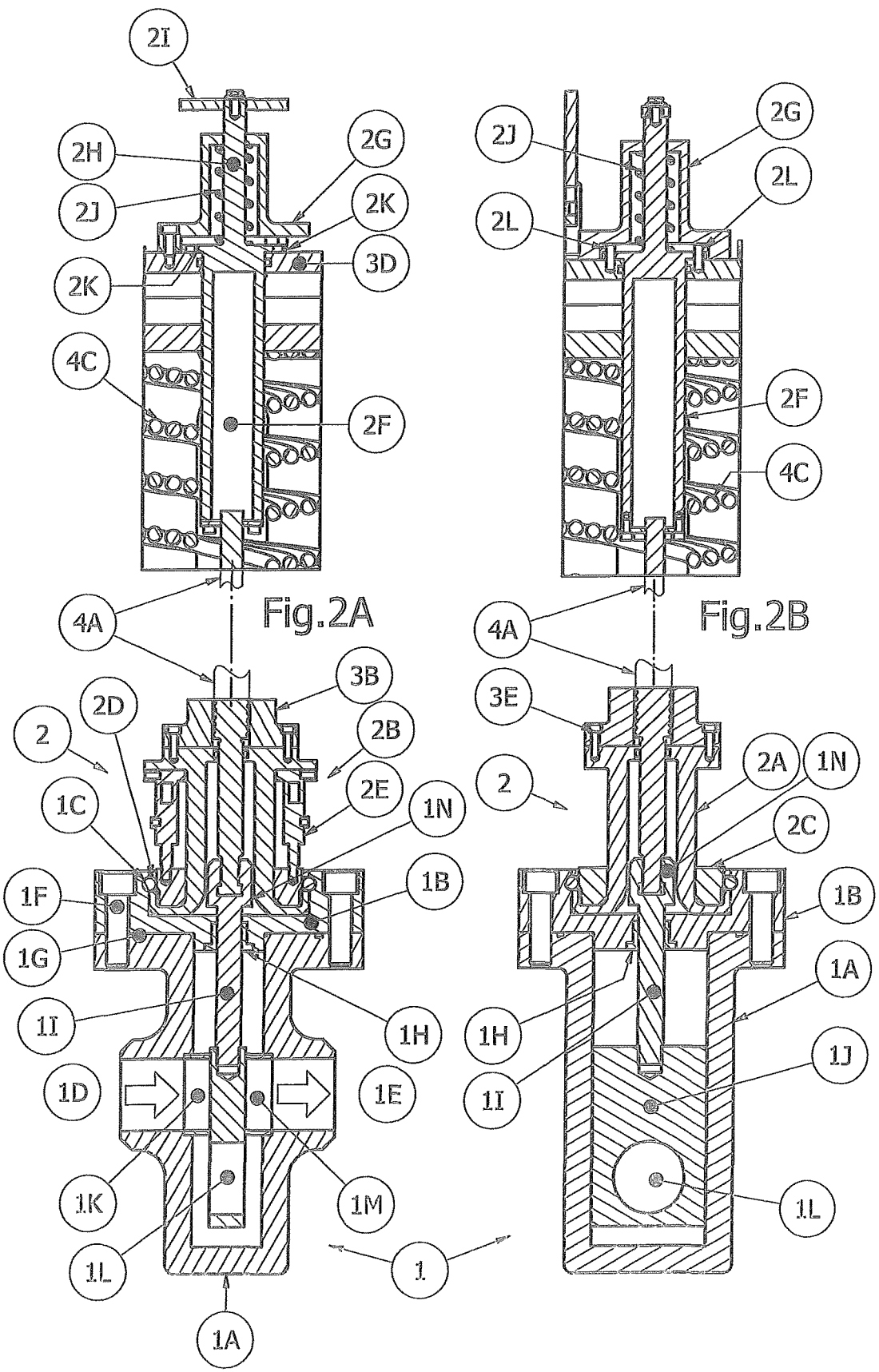

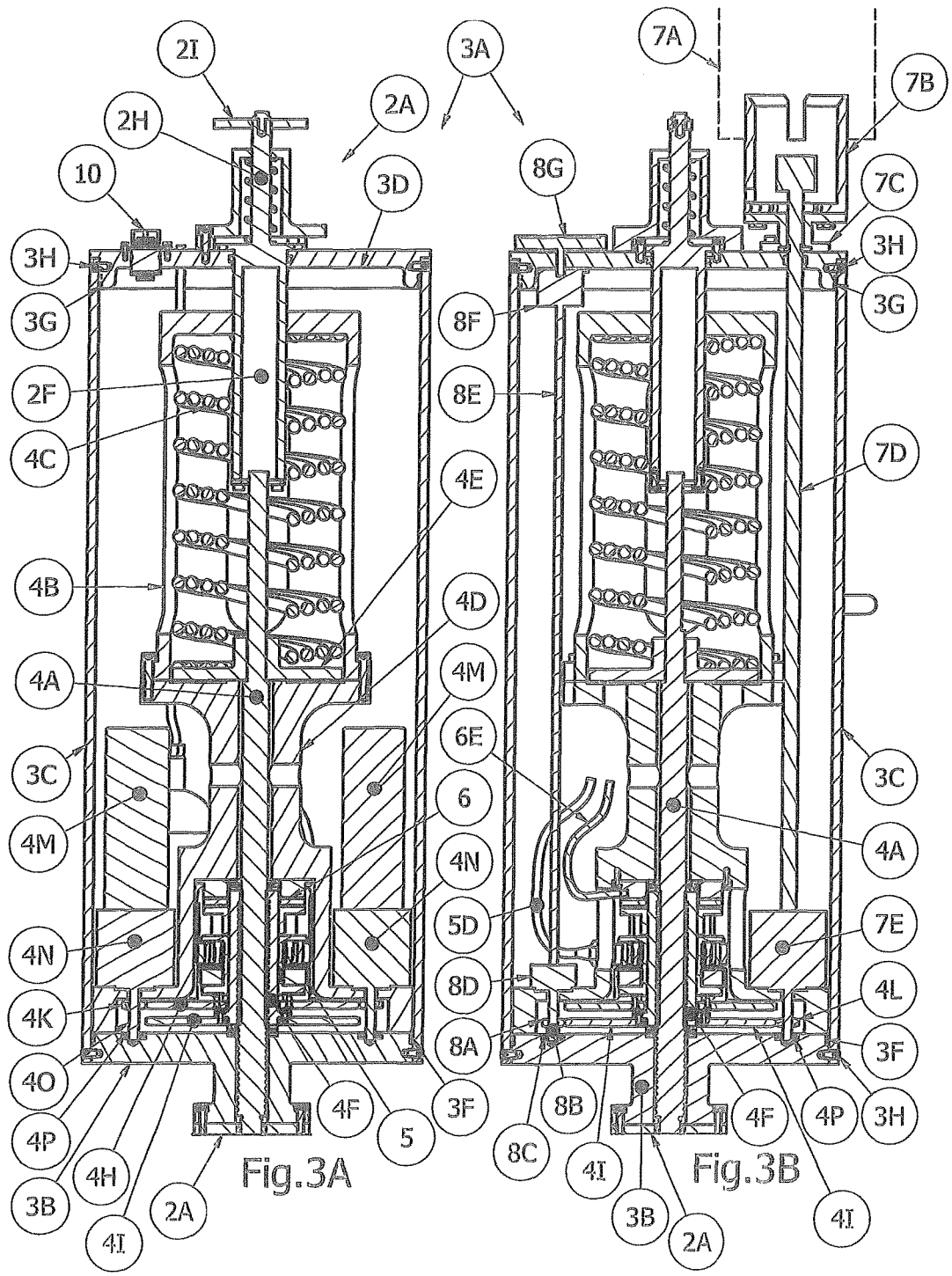

DEVICE FOR A SPRING RETURN VALVE ACTUATOR AND METHOD OF OPERATING A VALVE

The invention relates to a device for a valve actuator, the valve actuator being provided with a fixedly supported spindle nut which is in engagement with an external threaded portion of an actuator spindle and brings this to be moved axially by the rotation of a driving motor connected to the slide nut via transmission means. The actuator is provided with a device which provides for the valve to go to its closed position by the release of spring return in case of the actuator losing its power supply. A method of operating a valve is described as well.

In what follows, the function of the actuator is illustrated by the actuator being connected to an underwater sluice valve, the actuator being used to switch the valve between the closed and open positions. The actuator is provided with a spring that ensures automatic closing of the associated valve when a brake and a connector in engagement with the spindle nut lose electrical holding current. The actuator is also relevant for other applications, in which there is a need to switch the valve to intermediate positions in order to adjust the flow through the valve.

Conventionally, actuators for underwater sluice valves are operated via hydraulics. A new trend in the underwater industry is the use of electrically operated actuators as an alternative to hydraulics.

US 2009/0211762 A1, (GB 2458012 A) discloses a modular electric actuator solution for underwater valves which, by the rotation of a threaded spindle on the end of the electromotor shaft, axially moves a ball nut with an extension sleeve that surrounds the end of the spindle when in its inner position.

WO 2006/071124 A1 discloses an electric actuator solution which transmits the torque from a driving motor to a threaded spindle which axially moves a roller nut which is connected to an actuation mechanism.

US 2010/0127646 A1 discloses an electrical actuator solution which transmits a torque from driving motors to a spindle rotating a fixedly supported nut with a through-going threaded spindle connected to an actuation mechanism.

WO/2003/021077 discloses an actuator with a planetary roller screw mechanism which is moved axially via hydraulic actuation and converts the axial motion into rotation of the centre screw.

The invention has for its object to remedy or reduce at least one of the drawbacks of the prior art or at least provide a useful alternative to the prior art.

The object is achieved through features which are specified in the description below and in the claims that follow.

A valve actuator is provided, in which the rotation of a spindle nut results in an axial movement of an actuator spindle which is connected via a valve spindle to a valve slide, for example a valve gate, arranged in a valve housing. The actuator is provided with an actuator spring for returning the valve gate to its closed position on loss of holding current to a connector and a brake that are in rotation-preventing engagement with the spindle nut when the spring has been tightened via the actuator spindle during the opening of the valve.

In a first aspect, the invention relates more specifically to a device for a valve actuator, characterized by:

the valve actuator being provided with a spindle nut surrounding a portion of an actuator spindle and being in engagement with an external threaded portion arranged on the actuator spindle, the spindle nut being axially fixed relative to the actuator spindle;

the actuator spindle being in rotation-preventing engagement with a portion of an actuator attachment or an actuator housing; and the spindle nut being connected via transmission means to a driving motor; and the spindle nut being provided with an electromagnetic connector which is in permanent engagement with the rest of the transmission means of the motor and in engagement with the spindle nut by electromagnetic engagement of the connector; and the spindle nut being provided with an electromagnetic brake which is mounted on an actuator attachment and is in rotation-preventing engagement with the spindle nut by electromagnetic engagement of the brake; and the actuator spindle being connected to an actuator spring which is compressed by axial displacement of the actuator spindle and which moves the actuator spindle axially in the opposite direction, as, via the brake and connector, the spindle nut is released for rotation; and the valve actuator being provided with a coupling for disconnecting the actuator spindle from a valve spindle, which is attached to the valve slide, and a coupling for disconnecting the actuator housing from the valve.

The at least one driving motor may be an electromotor arranged in a pressure-tight actuator housing.

The valve actuator may be provided with a connecting device for a second, mobile driving motor, and the connecting device is in engagement with a spindle nut via transmission elements.

The transmission elements may include a coupling.

The second, mobile driving motor may be an underwater torque tool.

There may be at least one position sensor in association with the spindle nut or the transmission means, arranged to register the rotation of the spindle nut. The position sensor may be mechanical or electric.

In a second aspect, the invention relates more specifically to a method of operating a valve, characterized by the method including the steps of:

by the rotation of a spindle nut that surrounds a portion of an actuator spindle being in engagement with an external threaded portion arranged on the actuator spindle and is axially fixed relative to the actuator spindle, providing an axial displacement of the actuator spindle, while, at the same time, an actuator spring is being compressed when the valve is being opened, the rotation being provided by means of at least one driving motor.

The at least one driving motor may be an electromotor arranged in a pressure-tight actuator housing, and the electromotor is connected to a programmable control system.

The at least one driving motor may be a torque tool arranged on an underwater vessel and temporarily connected to the transmission elements via an external connecting device which is provided with a securing device that keeps the transmission elements engaged and locked for rotation when the spring has been tightened via the torque tool.

Automatic release of the spindle nut for rotation when an electromagnetic brake and connector lose holding current, so that a tightened actuator spring moves the actuator spindle axially, closing the valve.

By means of an underwater vessel, releasing the actuator from the valve by uncoupling the actuator spindle from the valve spindle and then uncoupling a coupling attaching the actuator to the valve; and in the reverse order, connecting the actuator to the valve and connecting the actuator spindle to the valve spindle.

In what follows, an example of a preferred embodiment is described, which is visualized in the accompanying drawings, in which:

FIG. 2A shows an axial section through the valve housing and the couplings for releasing the actuator from the valve;

FIG. 2B shows an axial section through the valve housing and the couplings for releasing the actuator from the valve, rotated 90° in relation to FIG. 2A;

FIG. 3A shows an axial section through the valve actuator;

FIG. 3B shows an axial section through the valve actuator, rotated 90° in relation to FIG. 3A;

Figure 1:
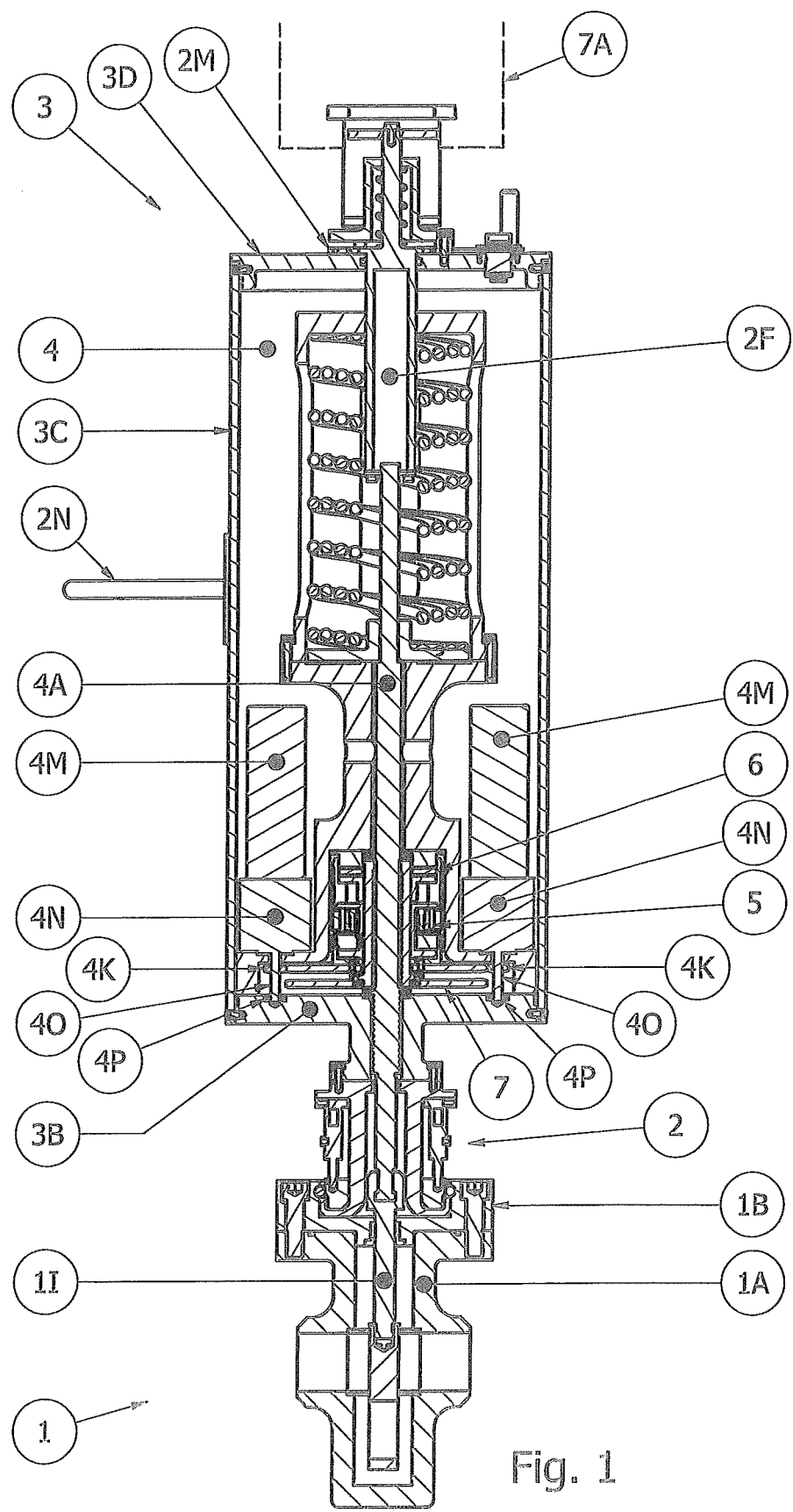
FIG. 1 shows an axial section through a sluice valve with a valve actuator according to the invention.

In what follows, it is taken as a starting point that a valve actuator is being used to manoeuvre a sluice valve. This does not imply a limitation of the scope of the invention, but serves as an example to explain the features included in the invention, which are visualized in the accompanying drawings.

In the drawings, the reference numeral 1 indicates a sluice valve with a valve housing 1A and a bonnet 1B for the valve housing 1A. The bonnet 1B is provided with a cut-out with a latch groove 1C adapted for a coupling 2 for a valve actuator 3 with devices placed in a pressure-tight manner in an actuator housing 3A which is defined by a mounting flange 3B, and actuator jacket 3C and an end cap 3D. In the actuator housing, actuating devices 4, an electromagnetic coupling 5, an electromagnetic brake 6, a transmission 7 for operation from an external torque tool 7A and a transmission for a mechanical position sensor 8, an electronic position sensor 9, a cable gland 10 and a pressure compensator 11 are arranged.

FIG. 1 shows a drawing in longitudinal section of the sluice valve 1 assembled with the coupling 2 and the valve actuator 3. FIGS. 2A and 2B show drawings in longitudinal sections of the valve 1 and coupling 2 with parts belonging thereto. FIG. 2A has been rotated 90° in relation to FIG. 2B.

The valve housing 1A is provided with welding end piece for flange connections at the inlet 1D and outlet 1E of the valve. The bonnet 1B has been fitted to the valve housing 1A with screws 1F and is provided with seals 1G. The bonnet 1B is provided with a stuffing box 1H for the passage of a valve spindle 1I. When the valve gate 1J has been pulled towards the bonnet 1B by means of the valve spindle 1I, the valve 1 is open to flow-through of fluid from the inlet 1D through the valve seat 1K, the port 1L of the valve gate 1J and out through the valve seat 1M to the outlet port 1E.

When the gate 1J is in its inner position in the valve housing 1A, the valve 1 is closed by the seats 1K, 1M sealing against the surface of the gate 1J as shown in FIG. 2A.

The coupling 2 is arranged to attach the actuator 3 to the valve 1 and consists of a coupling housing 2A and a locking device 2B which may be of various designs, for example with locking segments, or a ball lock as shown in FIGS. 2A-2B. The coupling 2 will be arranged for hydraulic or mechanical activation by means of an underwater vessel. The coupling housing 2A is secured in a recess externally on the valve bonnet 1B with a piston ring 2C which is arranged to force the balls 2D out into a latch groove 1C when hydraulic cylinders 2E are pressurized. The piston ring 2C will be provided with a securing device (not shown) which keeps the coupling 2 locked to the valve bonnet 1B. An actuator spindle 4A has been passed through a centre opening in the coupling housing 2A. The valve spindle 1I is attached to the actuator spindle 4A via a bayonet connection 1N on the end of the valve spindle 1I. The coupling housing 2A is formed with an internal cavity adapted to the external shape of the bayonet connection 1N which is moved axially in the cavity of the coupling housing 2A by the actuator spindle 4A. The coupling housing 2A with the locking device 2B will be provided with an injection port (not shown) for filling with a corrosion-preventing and lubricating medium.

FIGS. 2A and 2B show sections of the actuator 3 with a device for uncoupling the actuator spindle 4A from the valve spindle 1I before the valve actuator 3 is released from the valve 1 by means of the coupling 2. A cylindrical end case 2F has been extended through a centre opening in the end cap 3D where an external spring housing 2G is arranged. From the end case 2F, a shaft 2H has been extended through a centre hole in the spring housing 2G with an external handle 2I on the end of the shaft 2H. The other end of the end case 2F is formed with a centre opening corresponding to a non-circular profile on the end of the actuator spindle 4A projecting into the end case. The end case 2F is normally held in its locked position by the spring 2J. An edge on the end case 2F on the outside of the end cap 3D is formed with guiding grooves 2K for twisting of the end case 2F, in engagement with the actuator spindle 4A, within an angular sector limited by the guide pins 2L projecting up through the guiding grooves 2K from the end cap 3D as shown in FIG. 2B. When the end case 2F is being pulled out so that the spring 2J is compressed, the end case will be released from a latch groove or device (not shown) so that it may be twisted between the end positions; the fully connected or fully disconnected positions. The end case 2F may be turned to disconnect the actuator spindle 4A, or connect the actuator spindle to the valve spindle 1I at the bayonet connection 1N on the end of the valve spindle 1I. A mechanical indicator 2M has been attached to the end case 2F, projecting from a sector opening between the spring housing 2G and the end cap 3D as shown in FIGS. 1 and 4A.

Figures 4A, 4B:
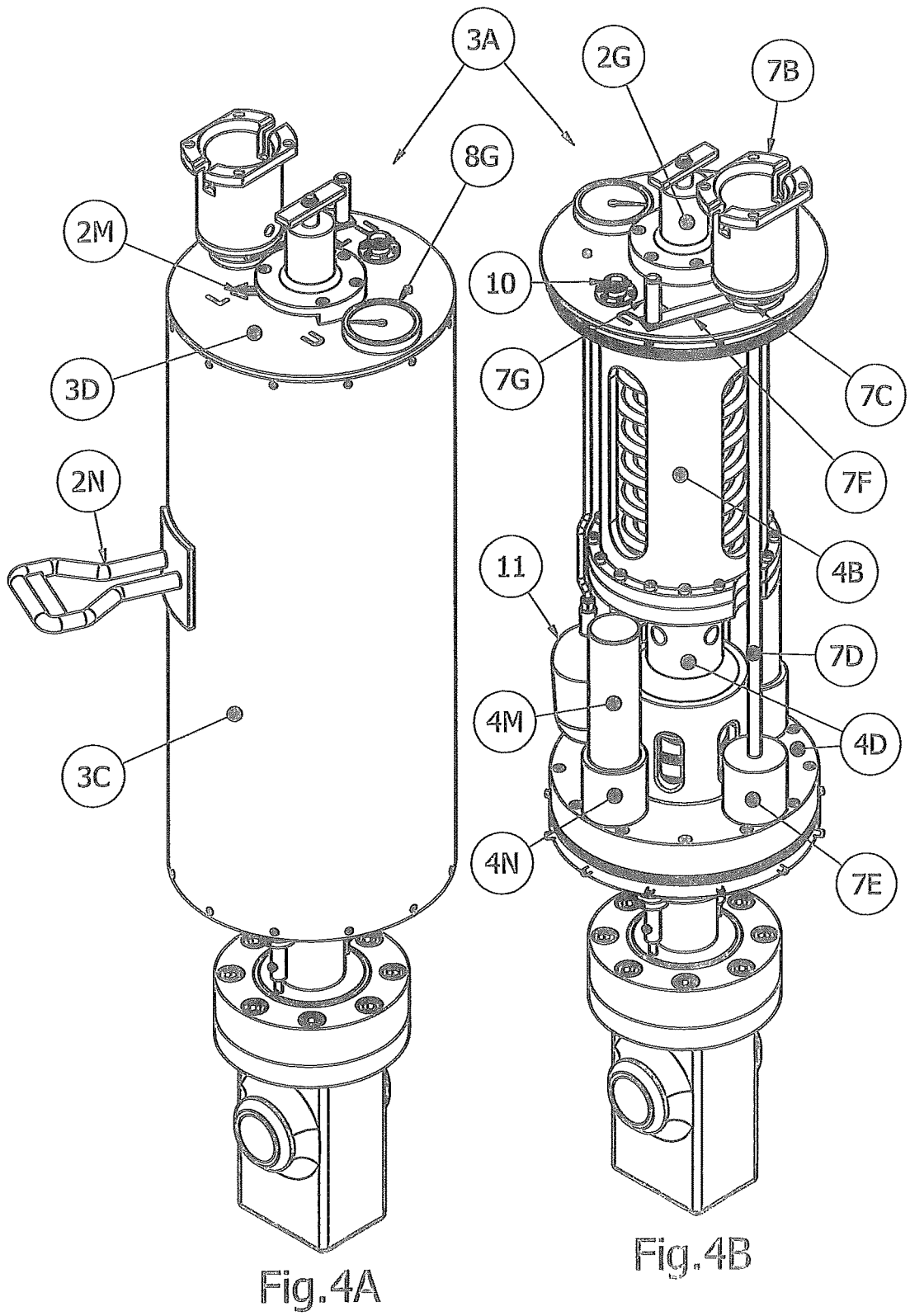
FIG. 4A shows a perspective drawing of the sluice valve and the valve actuator.
FIG. 4B shows a perspective drawing of the sluice valve and the valve actuator, in which, for the sake of exposition, the valve housing has been removed and the valve actuator has been rotated 180° in relation to FIG. 4A.

As it appears from the perspective drawing, FIG. 4A, there is a handle 2N placed externally on the actuator housing 3A for handling the actuator with an underwater vessel during the disconnection and connection of the actuator and other handling.

FIGS. 3A and 3B show drawings in longitudinal sections of the valve actuator 3 with the actuator housing 3A and internal actuating devices 4. FIG. 3B has been rotated 90° in relation to FIG. 3A.

A double mounting flange 3B with a through hole for the actuator spindle 4A is attached to the end of the coupling housing 2A with screws 3E. An actuator jacket 3C encloses the actuator devices 4. A first jacket seal 3F is arranged between the cylindrical actuator jacket 3C and the outer edge of the mounting flange 3B, and a second jacket seal 3G between the actuator jacket 3C and the outer edge of the end cap 3D. The cylindrical actuator jacket 3C is attached with screws 3H to, respectively, the outer edge of the mounting flange 3B and the outer edge of the end cap 3D.

An actuator spring housing 4B with at least one actuator spring 4C is secured to an end of the actuator attachment 4D. A spring plate 4E rests on the actuator attachment 4D when the actuator spring 4C is not compressed. The actuator spindle 4A is provided with a shoulder which abuts against the spring plate 4E and which contributes to pushing the spring plate 4E axially in the actuator spring housing 4B when the actuator spring 4C is being compressed by the spindle nut 4F being rotated, moving the actuator spindle 4A axially during the opening of the valve 1.

Figure 3C:
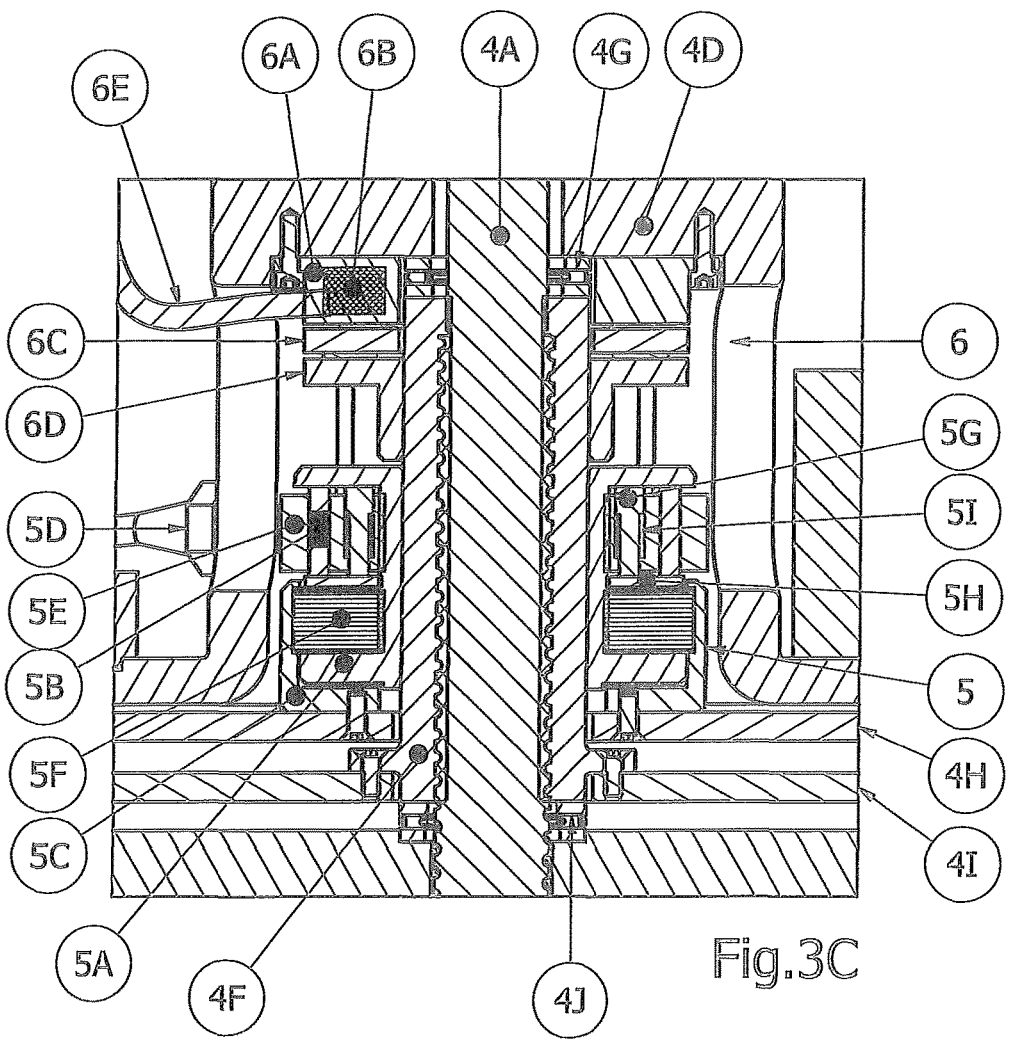
FIG. 3C shows, on a larger scale, a section of an axial section of the actuator with the actuator attachment, the spindle nut, supporting bearings, an electromagnetic connector, an electromagnetic brake and a driving gearwheel for the spindle nut.

FIG. 3C shows a section of the actuator 3 with the actuator attachment 4D which is formed with an internal recess for a stationary spindle nut 4F, a supporting bearing 4G, a coupling 5, a brake 6, external gearwheels 4H, 4I, and a supporting bearing 4J. Several smaller gearwheels internally in the actuator attachment 4D mesh with the gearwheels 4H and 4I. The gearwheels 4K are shown in FIG. 3A and the gearwheels 4L and 8A are shown in FIG. 3B. The actuator attachment 4D is provided with a through-going centre bore for the actuator spindle 4A. The actuator spindle 4A is formed with an external threaded portion which is in engagement with the spindle nut 4F. The spindle nut may be, for example, a so-called roller nut or a ball nut. As it appears from the FIGS. 2A-B, the free end of the actuator spindle has a non-circular profile which corresponds to a centre opening in the end case 2F, preventing the actuator spindle 4A from rotating when the spindle nut 4F is set into rotational motion to move the actuator spindle 4A axially.

An electromagnetic coupling 5 known per se surrounds a first end of the spindle nut 4F. A coupling part 5A with an electromagnet 5B is attached to the spindle nut 4F and rotates therewith. A drive plate 5C is attached to an external gearwheel 4H. When the electromagnet 5B is engaged with electrical holding current (DC) via the cable connection 5D and the sliding contacts 5E, as it appears from FIG. 3E, the spindle nut 4F is rotated as shown in FIG. 3A by a first driving motor 4M, typically an electric motor which is provided with a gear 4N, via the gearwheel 4K which is arranged on a gear shaft 4O, and the gearwheel 4H. The gear shafts 4O are provided with a supporting bearing 4P each, recessed in the mounting flange 3B. In one embodiment of the coupling 5, the torque is transmitted by the electromagnet 5B compressing a plate stack 5F of toothed plates alternatingly engaging either the coupling part 5A, which is attached to the spindle nut 4F, or the drive plate 5C, which is attached to the external gearwheel 4H. The power from the electromagnet 5B is typically transferred via pressure pins 5G which are secured to a pressure plate 5H, so that the friction between the compressed plates 5F keeps the coupling part 5A locked to the drive plate 5C. When the electromagnet 5B is not energized, the springs 5I push the pressure plate 5H back so that the plates in the plate stack 5F, which, via teeth on the individual plate, are in engagement with, respectively, the coupling part 5A and the drive plate 5C, may rotate freely.

An electromagnetic brake 6 known per se surrounds a second end of the spindle nut 4F and the supporting bearing 4G. The armature plate 6A with an electromagnet 6B is fixed in an internal recess in the actuator attachment 4D. A friction disc 6C is attached to the connector piece 6D via resilient elements (not shown), and the connector piece 6D is fixed to the spindle nut 4F. The friction disc 6C is separated from the stationary armature plate 6A by a gap so that the spindle nut 4F with the friction disc 6C and the connector piece 6D may rotate freely when the brake is not energized. When the electromagnet 6B is engaged with electrical holding current (DC) via the cable connection 6E, the brake 6 prevents the spindle nut 4F from rotating, by the spring force being overcome and the friction disc 6C being pulled towards the stationary armature plate 6A, so that there is friction between the plates 6A, 6C. An alternative embodiment of the brake 6 may be with multi-plates as a friction element.

As it appears from the drawing 3B in longitudinal section, in one embodiment, the spindle nut 4F may be rotated by means of a torque tool 7A from an underwater vessel. The torque tool 7A may be connected to a connecting device 7B which is mounted externally on the end cap 3D via a flange 7C. From the connecting device 7B, an axially displaceable torque shaft 7D is arranged, which is attached to one half of a coupling 7E. A spring (not shown) keeps the coupling halves disconnected during normal operation of the actuator 3. When, through axial displacement by the torque tool 7A, the torque shaft 7D compresses the spring so that the coupling halves of the coupling 7E are engaged, the torque from the torque tool 7A is transmitted through the coupling for the rotation of the spindle nut 4F via the gearwheel 4L in mesh with the external gearwheel 4I fixed to the spindle nut 4F. The shaft of the gearwheel 4L is supported in a supporting bearing 4P, recessed in the mounting flange 3B.

As it appears from the perspective drawing 4B, a mechanical securing device 7F for the transmission elements 7D and 7E is placed on the flange 7C to avoid free rotation of the spindle nut 4F when the valve 1 has been opened via a torque tool 7A. The securing device 7F is arranged to hold the torque shaft 7D in its inner position, while at the same time, rotation of the shaft 7D is prevented, as the actuator spring 4C has been tightened and the electromagnetic coupling 5 and the brake 6 are not energized and thereby are disengaged. The locking device 7F is provided with a handle 7G for the securing device 7F to be engaged and disengaged by means of an underwater vessel.

As it appears from the drawing 3B in longitudinal section, the actuator 3 is provided with a mechanical position sensor for registering the turns of the spindle nut 4F. A gearwheel 8A meshes with the external gearwheel 4I fixed to the spindle nut 4F. The shaft 8B of the gearwheel 8A is supported in a supporting bearing 8C, recessed in the mounting flange 3B. The torque from the gearwheel 8A is transmitted via a first gear 8D to a torque shaft 8E connected to a second gear 8F which is connected to an indicator 8G on the outside of the end cap 3D of the actuator 3.

Figure 3D:
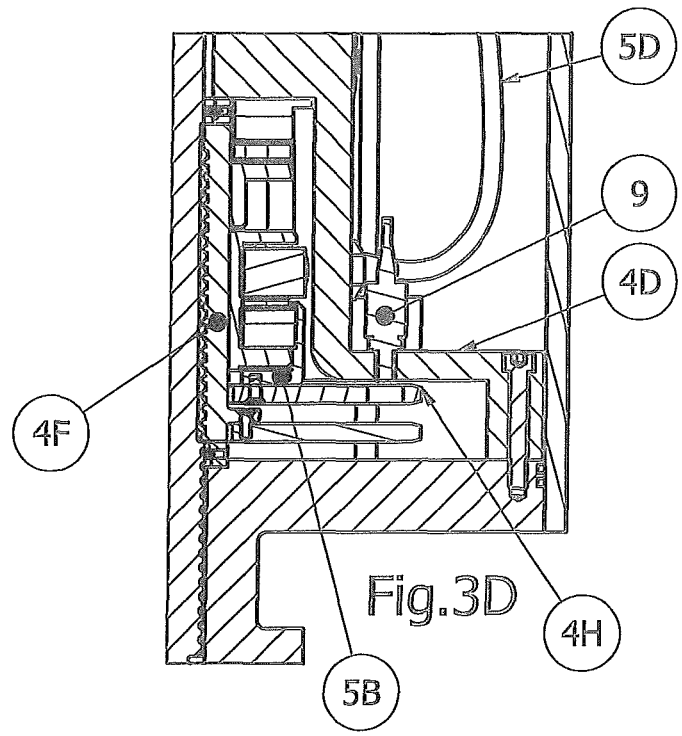
FIG. 3D shows a section of an axial section of the actuator with a position sensor for measuring the rotation of the driving gearwheel for the spindle nut.
Figure 3E:
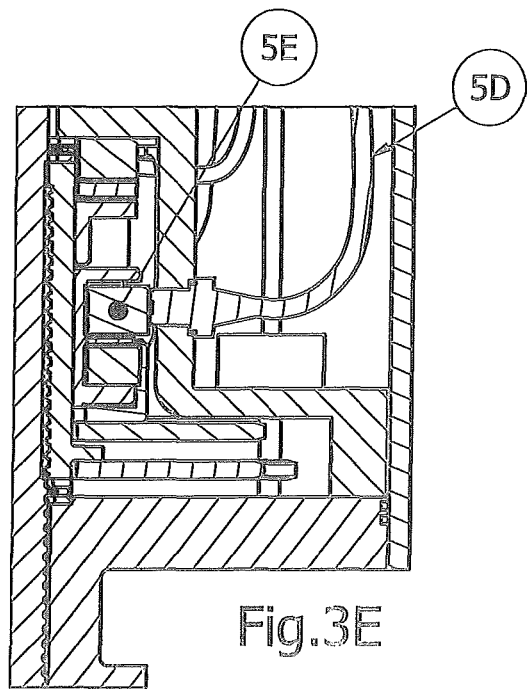
FIG. 3E shows a section of an axial section of the actuator with power supply via sliding contacts to the electromagnetic connector for the spindle nut.

As it appears from FIG. 3D, an electronic position sensor 9 for registering turns of the spindle nut 4F is positioned on the actuator attachment 4D with a passage to the recess of the actuator attachment 4D for registering the movement of the gearwheel 4H which is attached to the drive plate 5B for the spindle nut 4F. For example, the sensor registers holes in the gearwheel 4H as indicated in the figure.

It is prior art for an electronic pulse transmitter to be integrated as standard in an electric motor 4M and for the output signal to be used for position control.

From the outside of the end cap 3D of the actuator 3, a cable connection (not shown) runs through a cable gland 10 for signal transmission and electrical power supply.

Possibly, more cable glands may be relevant. On the inside of the actuator jacket 3C, between the cable gland 10 and an electronics container (not shown), there are more cable connections (not shown). The actuator housing 3A is filled with an electrically insulating medium, for example silicone oil, and is pressure-compensated against the surrounding seawater pressure via a pressure compensator 11 known per se.

The invention claimed is:

1. A method of operating a valve by means of a valve actuator, characterized in that the method includes the steps of:
    providing an axial displacement of an actuator spindle by rotating a spindle nut on the actuator spindle by means of at least one driving motor, the spindle nut engaging with an external threaded portion arranged on the actuator spindle and is axially fixed relative to the actuator spindle, thereby compressing an actuator spring via the actuator spindle and a spring plate;
    keeping the spindle nut connected to a transmission means by providing a coupling with holding current;
    keeping an actuator spring tightened by providing a brake with holding current; closing the valve automatically by spring return on loss of holding current to the coupling or brake;
    releasing the valve actuator from the valve by disconnecting the actuator spindle from a valve spindle and disconnecting an actuator housing from a valve housing; and
    connecting the valve actuator to the valve by locking the actuator housing to the valve housing and connecting the actuator spindle to the valve spindle.

2. The method according to claim 1, wherein the at least one driving motor is an electromotor arranged in the actuator housing, the actuator housing being pressure tight and the electromotor being connected to a programmable control system.

3. The method according to claim 1, wherein the at least one driving motor is a torque tool arranged on an underwater vessel and temporarily connected to transmission elements via an external connecting device for an underwater torque tool.

* * * * *